United States Patent
Park

(10) Patent No.: US 11,342,571 B2
(45) Date of Patent: May 24, 2022

(54) COOLANT CONTROL SYSTEM AND CONTROL METHOD OF FUEL CELL

(71) Applicants: Hyundai Motor Company, Seoul (KR); Kia Motors Corporation, Seoul (KR)

(72) Inventor: Joon Guen Park, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 184 days.

(21) Appl. No.: 16/816,788

(22) Filed: Mar. 12, 2020

(65) Prior Publication Data

US 2021/0104762 A1 Apr. 8, 2021

(30) Foreign Application Priority Data

Oct. 8, 2019 (KR) .................. 10-2019-0124498

(51) Int. Cl.
*H01M 8/04* (2016.01)
*H01M 8/04746* (2016.01)
*H01M 8/04044* (2016.01)
*H01M 8/04537* (2016.01)
*H01M 8/0444* (2016.01)
*H01M 8/0432* (2016.01)

(52) U.S. Cl.
CPC ..... *H01M 8/04768* (2013.01); *H01M 8/0432* (2013.01); *H01M 8/04044* (2013.01); *H01M 8/04485* (2013.01); *H01M 8/04634* (2013.01)

(58) Field of Classification Search
CPC ......... H01M 8/04029; H01M 8/04044; H01M 8/04067; H01M 8/0432; H01M 8/04365; H01M 8/04485; H01M 8/04559; H01M 8/04634; H01M 8/04768; Y02E 60/50
See application file for complete search history.

(56) References Cited

U.S. PATENT DOCUMENTS

| | | | |
|---|---|---|---|
| 7,722,977 B2 | 5/2010 | Sato et al. | |
| 2005/0118468 A1* | 6/2005 | Adams | H01M 8/0494 429/410 |

(Continued)

FOREIGN PATENT DOCUMENTS

| | | |
|---|---|---|
| JP | 2002-367640 A | 12/2002 |
| JP | 2003-142132 A | 5/2003 |
| JP | 2004-311055 A | 11/2004 |

(Continued)

*Primary Examiner* — Brittany L Raymond
(74) *Attorney, Agent, or Firm* — Morgan, Lewis & Bockius LLP

(57) ABSTRACT

A coolant control system of a fuel cell may include the fuel cell; a coolant line allowing a coolant to circulate therein and connected to the fuel cell to be heat-exchangeable with the fuel cell; an ion removal line provided with an ion filter and connected to a first portion and a second portion of the coolant line to allow a coolant branched from the first portion of the coolant line to pass through the ion filter and then flow into the second portion of the coolant line again; an adjusting valve adjusting a ratio between coolants respectively flowing into the coolant line and the ion removal line; and a controller engaged to the adjusting valve and configured for controlling the adjusting valve based on a temperature of the fuel cell or an output voltage of the fuel cell.

17 Claims, 5 Drawing Sheets

(56) References Cited

U.S. PATENT DOCUMENTS

2018/0114998 A1\* 4/2018 Kwon ............... H01M 8/04029
2019/0363376 A1\* 11/2019 Yamaue ............ H01M 8/04225

FOREIGN PATENT DOCUMENTS

| JP | 2005-166267 A | 6/2005 |
|---|---|---|
| JP | 4726182 B2 | 4/2011 |
| JP | 4901169 B2 | 3/2012 |
| JP | 2005-190705 A | 7/2015 |

\* cited by examiner

COOLANT CONTROL SYSTEM AND CONTROL METHOD OF FUEL CELL

CROSS REFERENCE TO RELATED APPLICATION

The present application claims priority to Korean Patent Application No. 10-2019-0124498, filed on Oct. 8, 2019, the entire contents of which is incorporated herein for all purposes by this reference.

BACKGROUND OF THE INVENTION

Field of the Invention

The present invention relates to a coolant control system and control method of a fuel cell, and more particularly, to a technology to control flow of a coolant to remove ions in the coolant of a fuel cell.

Description of Related Art

A fuel cell may convert chemical energy into electrical energy using a redox reaction of hydrogen and oxygen supplied from a hydrogen supply device and an air supply device, respectively. The fuel cell may include a fuel cell stack producing the electrical energy, a cooling system cooling the fuel cell stack, and the like.

That is, hydrogen may be supplied to an anode of the fuel cell and oxidation reaction of the hydrogen in the anode may proceed to generate protons and electrons. The protons and electrons generated here may be moved to a cathode through an electrolyte membrane and a separation plate, respectively. Water may be produced at the cathode through an electrochemical reaction involving the protons and electrons, which are moved from the anode, and oxygen in the air. The electrical energy may be generated from the present flow of the electrons.

A voltage of the fuel cell stack may be proportional to the number of stacked cells. In a high-power system used in a vehicle, a power plant, or the like, the number of the stacked cells may be increased, generating a high voltage.

A voltage of several hundred volts may be generated at an end of the fuel cell stack generating the high voltage, and thus corrosion may occur in a metal separation plate of the fuel cell stack. The higher the voltage is generated, the more actively electrons are moved, accelerating the corrosion.

In case that the metal separation plate of the fuel cell stack is corroded, a junction between the metal separation plate and a gasket may be damaged. This damage may cause a high possibility of gas leakage, which may result in hydrogen leakage. In particular, due to the hydrogen leakage, a fuel cell system may have a reduced efficiency or may be shut down, or a fire may occur depending on whether the hydrogen leakage reacts with external oxygen.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for removing ions from a coolant cooling a fuel cell without a separate additional hardware.

According to an exemplary embodiment of the present invention, a coolant control system of a fuel cell may include: the fuel cell; a coolant line allowing a coolant to circulate therein and connected to the fuel cell to be heat-exchangeable with the fuel cell; an ion removal line provided with an ion filter and connected to a first portion and a second portion of the coolant line to allow a coolant branched from the first portion of the coolant line to pass through the ion filter and then flow into the second portion of the coolant line again; an adjusting valve adjusting a ratio between coolants respectively flowing into the coolant line and the ion removal line; and a controller engaged to the adjusting valve and configured for controlling the adjusting valve based on a temperature of the fuel cell or an output voltage of the fuel cell.

The adjusting valve may be a three-way valve positioned at a point where the coolant line is branched to the ion removal line or positioned at a point where the ion removal line joins the coolant line.

The controller may be configured to control the adjusting valve to increase a ratio of the coolant flowing into the ion removal line in case that the output voltage of the fuel cell is equal to or greater than a predetermined total voltage.

The controller may be configured to determine an average cell voltage by dividing the output voltage of the fuel cell by a total number of cells of the fuel cell and may control the adjusting valve to increase the ratio of the coolant flowing into the ion removal line in case that a determined average cell voltage is equal to or greater than a predetermined cell voltage.

The controller may compare the temperature of the fuel cell with a predetermined limit temperature and control the adjusting valve to increase the ratio of the coolant flowing into the ion removal line only in case that the temperature of the fuel cell is lower than the predetermined limit temperature.

The controller may compare the temperature of the fuel cell with a control target temperature and may control the adjusting valve to increase the ratio of the coolant flowing into the ion removal line only in case that the temperature of the fuel cell is lower than a temperature obtained by adding a predetermined difference value to the control target temperature.

The controller may be configured to control the adjusting valve to decrease the ratio of the coolant flowing into the ion removal line in case that the temperature of the fuel cell is equal to or higher than the predetermined limit temperature, the temperature of the fuel cell is equal to or greater than the temperature obtained by adding the predetermined difference value to the control target temperature, or the output voltage of the fuel cell is lower than the predetermined total voltage.

The coolant control system of a fuel cell may further include a conductivity sensor provided on the coolant line and configured for detecting an electrical conductivity of a coolant flowing into the coolant line, wherein the controller may be configured to control the adjusting valve based on the electrical conductivity detected by the conductivity sensor.

The controller may be configured to control the adjusting valve to increase the ratio of the coolant flowing into the ion removal line in case that the electrical conductivity detected by the conductivity sensor is equal to or greater than a predetermined limit conductivity.

The coolant control system of a fuel cell may further include: a first bypass passage branched from the coolant line at an upstream point of the fuel cell, bypassing the fuel cell and joining the coolant line again; and a first bypass valve adjusting a ratio between the coolants respectively flowing into the coolant line and the first bypass passage.

The adjusting valve may be a four-way valve positioned at a point where the ion removal line joins the coolant line and integrated with the first bypass valve to simultaneously adjust the ratio between the coolants respectively flowing into the coolant line and the ion removal line and the ratio between the coolants respectively flowing into the coolant line and the first bypass passage.

The coolant control system of a fuel cell may further include: a second bypass passage branched from the coolant line at a downstream point of the fuel cell, bypassing a radiator provided on the coolant line and joining the coolant line again; and a second bypass valve adjusting a ratio between the coolants respectively flowing into the coolant line and the second bypass passage.

The adjusting valve may be a four-way valve positioned at a point where the coolant line is branched to the ion removal line and integrated with the second bypass valve to simultaneously adjust the ratio between the coolants respectively flowing into the coolant line and the ion removal line and the ratio between the coolants respectively flowing into the coolant line and the second bypass passage.

According to an exemplary embodiment of the present invention, a coolant control method of a fuel cell may include: measuring an output voltage of the fuel cell; and adjusting a ratio between coolants respectively flowing into a coolant line and an ion removal line which is provided with an ion filter and branched from and again joining the coolant line based on a measured output voltage of the fuel cell.

In the adjusting of the ratio between the coolants, the adjusting valve may be controlled to increase the ratio of the coolant flowing into the ion removal line in case that the output voltage of the fuel cell is equal to or greater than a predetermined total voltage.

The coolant control method of a fuel cell may further include measuring or estimating a temperature of the fuel cell before the adjusting of the ratio between the coolants, wherein in the adjusting of the ratio between the coolants, the adjusting valve may be controlled to increase the ratio of the coolant flowing into the ion removal line only in case that either a measured or estimated temperature of the fuel cell is lower than a predetermined limit temperature or the measured or estimated temperature of the fuel cell is lower than a temperature obtained by adding a predetermined difference value to a control target temperature.

The coolant control method of a fuel cell may further include measuring or estimating a temperature of the fuel cell before the adjusting of the ratio between the coolants, wherein in the adjusting of the ratio between the coolants, the adjusting valve may be controlled to decrease the ratio of the coolant flowing into the ion removal line in case that the measured or estimated temperature of the fuel cell is equal to or higher than the predetermined limit temperature, the measured or estimated temperature of the fuel cell is equal to or greater than a temperature obtained by adding the predetermined difference value to the control target temperature, or the output voltage of the fuel cell is lower than the predetermined total voltage.

The coolant control method of a fuel cell may further include detecting an electrical conductivity of a coolant flowing into the coolant line before the adjusting of the ratio between the coolants, wherein in the adjusting of the ratio between the coolants, the adjusting valve may be controlled to increase the ratio of the coolant flowing into the ion removal line in case that a detected electrical conductivity of the coolant is equal to or greater than a predetermined limit conductivity.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
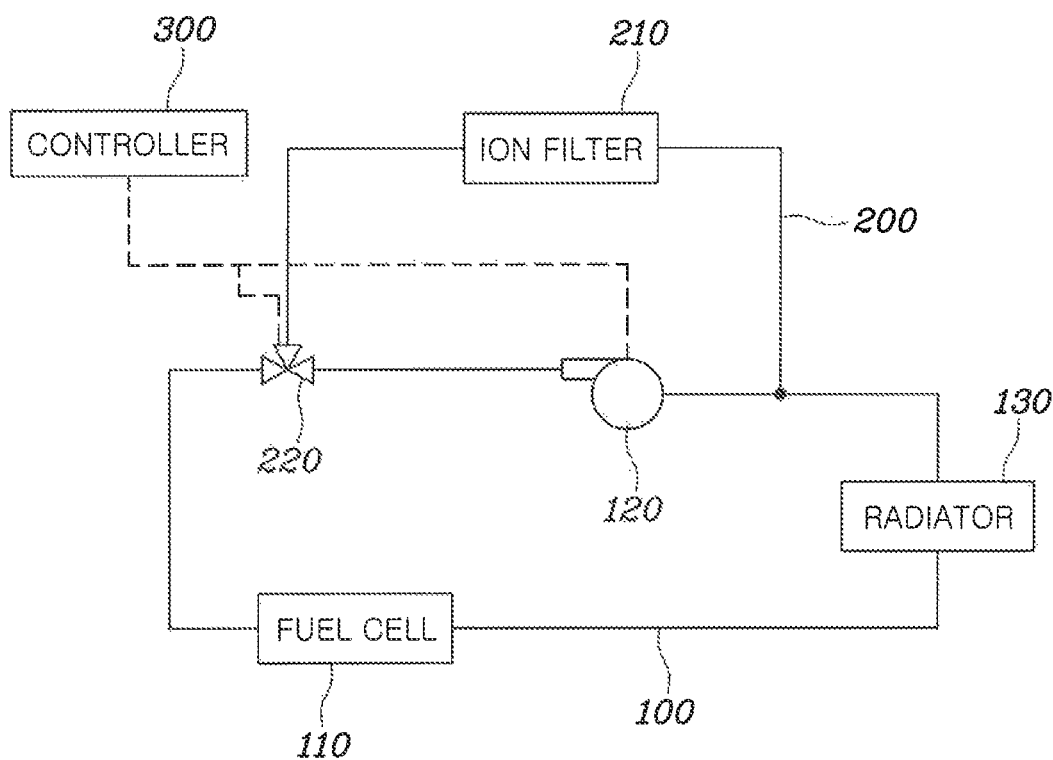
FIG. 1 is a block diagram illustrating a coolant control system of a fuel cell according to an exemplary embodiment in an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific descriptions on structure and function of embodiments of the present invention described herein are merely illustrative. The exemplary embodiments may be implemented in various forms and the above descriptions are not construed to limit the present invention thereto.

Since the present invention may be variously modified and have several exemplary embodiments of the present invention, specific exemplary embodiments will be shown in the accompanying drawings and be described in detail. However, it is to be understood that the present invention is not limited to specific exemplary embodiments of the present invention, but includes all modifications, equivalents, and substitutions included in the spirit and the scope of the present invention.

Terms such as "first", "second", etc., may be used to describe various components, but the components are not to be construed as being limited to the terms. The terms are used only to distinguish one component from another component. For example, the "first" component may be named the "second" component and the "second" component may also be similarly named the "first" component, without departing from the scope of the present invention.

It is to be understood that when one element is referred to as being "connected to" or "coupled to" another element, it may be directly connected to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between," "directly between," "neighboring to," "directly neighboring to" and the like, may be similarly interpreted.

Terms used in the exemplary embodiment are used only to describe specific exemplary embodiments rather than limiting the present invention. Singular forms used herein are intended to include plural forms unless explicitly indicated otherwise. It will be further understood that the terms "comprise" or "have" used in the exemplary embodiment, specify the presence of stated features, numerals, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms have the same meaning as those that are understood by those who skilled in the art. It may be understood that the terms defined by the dictionary are identical with the meanings within the context of the related art, and they may not be ideally or excessively formally defined unless the context clearly dictates otherwise.

Hereinafter, exemplary embodiments of the present invention will be described in detail with reference to the accompanying drawings. Like reference numerals denote like components throughout the drawings.

Figure 2:
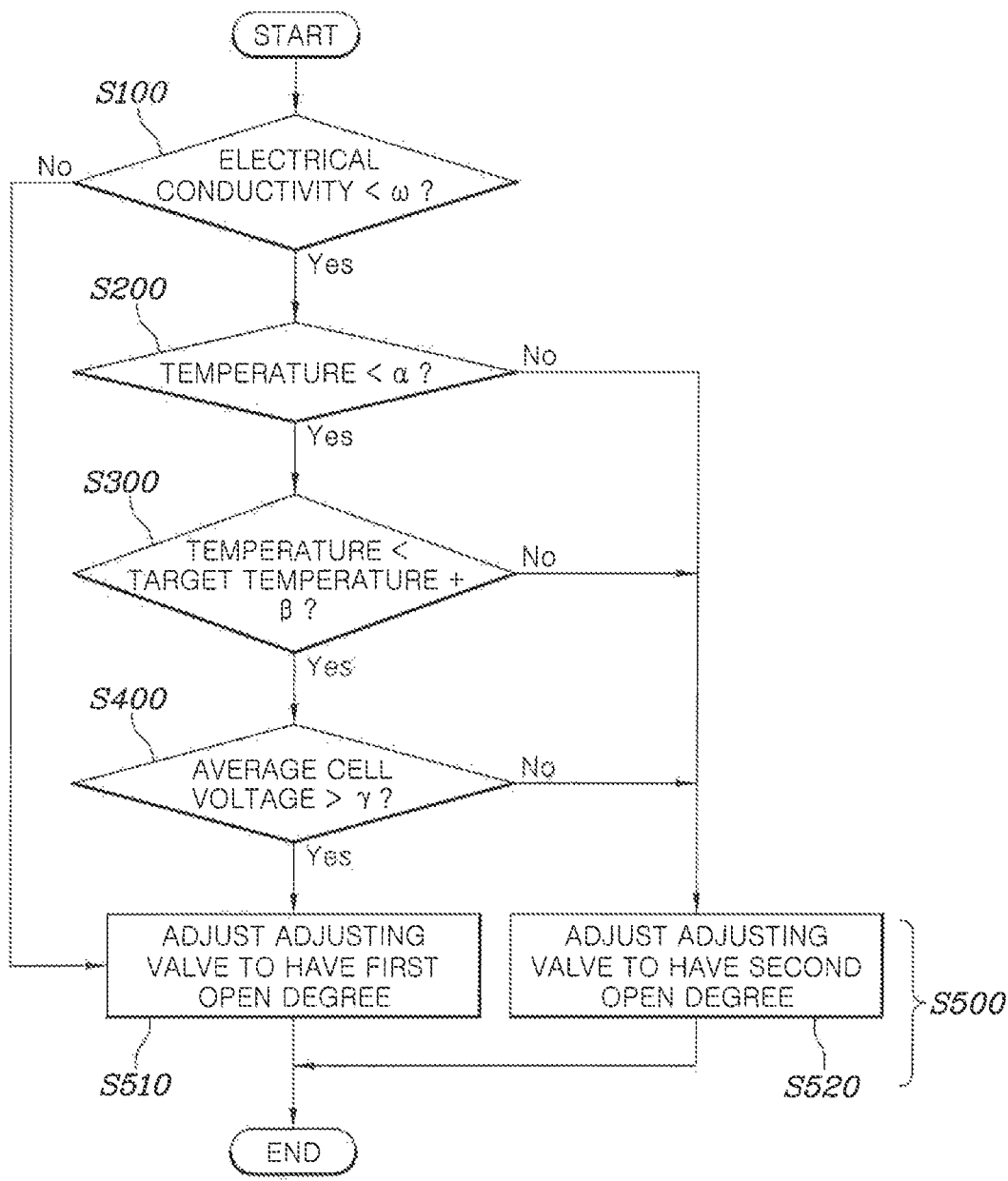
FIG. 2 is a flow chart illustrating a coolant control method of a fuel cell according to an exemplary embodiment in an exemplary embodiment of the present invention.

FIG. 1 is a block diagram illustrating a coolant control system of a fuel cell 110 according to an exemplary embodiment in an exemplary embodiment of the present invention; and FIG. 2 is a flow chart illustrating a coolant control method of a fuel cell 110 according to an exemplary embodiment in an exemplary embodiment of the present invention.

Referring to FIG. 1 and FIG. 2, a coolant control system of a fuel cell 110 according to an exemplary embodiment in an exemplary embodiment of the present invention may include: the fuel cell 110; a coolant line 100 allowing a coolant to circulate therein and connected to the fuel cell 110 to be heat-exchangeable with the fuel cell 110; an ion removal line 200 provided with an ion filter 210 and coupled to the coolant line 100 to allow a coolant branched from the coolant line 100 to pass through the ion filter 210 and then flow into the coolant line 100 again; an adjusting valve 220 adjusting a ratio between coolants respectively flowing into the coolant line 100 and the ion removal line 200; and a controller 300 controlling the adjusting valve 220 based on a temperature of the fuel cell 110 or an output voltage of the fuel cell 110.

The controller 300 according to an exemplary embodiment in an exemplary embodiment of the present invention may be implemented by an algorithm configured to control operations of various components of a vehicle, a nonvolatile memory configured to store data on software instructions reproducing the algorithm, and a processor configured to perform operations described below using the data stored in the memory. Here, the memory and the processor may be implemented as separate chips. Alternatively, the memory and the processor may be implemented as a single chip integrated with each other. The processor may be implemented as one or more processor chips.

The fuel cell 110 may refer to a fuel cell stack 110 including a plurality of unit cells. The fuel cell stack 110 may include a plurality of unit cells respectively separated by separation plates therein, and may generate an electric power such that hydrogen and air are supplied into the unit cells and reacted with each other.

The coolant line 100 may be a line connected to the fuel cell 110 to allow a coolant to circulate therein. The coolant line 100 may be provided with a cooling pump 120 circulating a coolant therein and a radiator 130 allowing a coolant in the coolant line 100 to exchange heat with an outside air.

The ion removal line 200 may be provided with an ion filter 210 and coupled to the coolant line 100 to allow the coolant branched from the coolant line 100 and then passed through the ion filter 210 to flow into the coolant line 100 again. The ion filter 210 may be configured to filter ions included in a coolant passing therethrough and may be a consumable which needs to be replaced periodically.

The adjusting valve 220 may adjust the ratio between the coolants respectively flowing into the coolant line 100 and the ion removal line 200. In detail, the adjusting valve 220 may control a flow rate of a coolant branched from the coolant line 100 and then flowing into the ion removal line 200, and may adjust a ratio between a flow rate of the coolant flowing into the ion removal line 200 and that of a coolant bypassing the ion removal line 200.

In an exemplary embodiment of the present invention, the adjusting valve 220 may be a three-way valve positioned at a point where the coolant line 100 is branched to the ion removal line 200 or positioned at a point where the ion removal line 200 joins the coolant line 100.

The controller 300 may control the adjusting valve 220 based on the temperature of the fuel cell 110 or the output voltage of the fuel cell 110. The controller 300 may control the adjusting valve 220 to supply the fuel cell 110 with a coolant circulating depending on a driving of the cooling pump 120, cooling the fuel cell 110. Furthermore, the controller 300 may control a portion of a coolant in the coolant line 100 to flow into the ion removal line 200, removing ions from the coolant line 100. Accordingly, the coolant flowing into the coolant line 100 may have a reduced electrical conductivity.

In detail, as described below, the controller 300 may control the adjusting valve 220 to control the flow rate of the coolant flowing into the ion removal line 200 based on the temperature of the fuel cell 110 or the output voltage of the fuel cell 110.

According to an exemplary embodiment of the present invention, the controller 300 may control the adjusting valve 220 to increase a ratio of the coolant flowing into the ion removal line 200 in case that the output voltage of the fuel cell 110 is equal to or greater than a predetermined total voltage.

The controller 300 may determine an average cell voltage by dividing the output voltage of the fuel cell 110 by a total number of cells of the fuel cell 110 and may control the adjusting valve 220 to increase the ratio of the coolant flowing into the ion removal line 200 in case that a determined average cell voltage is equal to or greater than a predetermined cell voltage.

In case that the average cell voltage of the fuel cell 110 is the predetermined cell voltage (for example, 0.9 [V]) or higher, the controller 300 may control the adjusting valve 220 to increase the ratio of the coolant flowing into the ion removal line 200. In another exemplary embodiment of the present invention, the controller 300 may control the adjusting valve 220 such that as the average cell voltage of the fuel cell 110 is increased, the ratio of the coolant flowing into the ion removal line 200 is gradually increased.

In detail, in case that the output voltage or the average cell voltage of the fuel cell 110 is increased, a high potential may be formed between the separation plates included in the fuel cell 110, accelerating the corrosion thereof. To prevent the present corrosion, the ions may be controlled to be reduced from the coolant.

In case that the ratio of the coolant flowing into the ion removal line 200 is increased, a flow rate of the coolant flowing into the fuel cell 110 may be decreased. However, in a state where the output voltage of the fuel cell 110 is increased, an output current of the fuel cell 110 may be relatively reduced. Accordingly, heat generation amount and required cooling amount of the fuel cell 110 may be reduced, and thus the fuel cell 110 may be sufficiently cooled.

Furthermore, the controller 300 may control the adjusting valve 220 based on the temperature of the fuel cell 110.

According to an exemplary embodiment of the present invention, the controller 300 may compare the temperature of the fuel cell 110 with a predetermined limit temperature and control the adjusting valve 220 to increase the ratio of the coolant flowing into the ion removal line 200 only in case that the temperature of the fuel cell 110 is lower than the predetermined limit temperature.

According to another exemplary embodiment of the present invention, the controller 300 may compare the temperature of the fuel cell 110 with a control target temperature and may control the adjusting valve 220 to increase the ratio of the coolant flowing into the ion removal line 200 only in case that the temperature of the fuel cell 110 is lower than a temperature obtained by adding a predetermined difference value to the control target temperature.

A top priority of a cooling system of the fuel cell 110 is to control the temperature of the fuel cell 110. Therefore, even in a situation where the output voltage of the fuel cell 110 is increased, the controller 300 may control the adjusting valve 220 so that the temperature of the fuel cell 110 is not increased.

Accordingly, the controller 300 may control the adjusting valve 220 to decrease the ratio of the coolant flowing into the ion removal line 200 in case that the temperature of the fuel cell 110 is equal to or higher than the predetermined limit temperature or the temperature of the fuel cell 110 is equal to or greater than the temperature obtained by adding the predetermined difference value to the control target temperature. Accordingly, the temperature of the fuel cell 110 may be controlled not to be increased.

That is, the controller 300 may control the adjusting valve 220 to decrease the ratio of the coolant flowing into the ion removal line 200 in case that the temperature of the fuel cell 110 is equal to or higher than the predetermined limit temperature, the temperature of the fuel cell 110 is equal to or greater than the temperature obtained by adding the predetermined difference value to the control target temperature, or the output voltage of the fuel cell 110 is lower than the predetermined total voltage.

Figure 3:
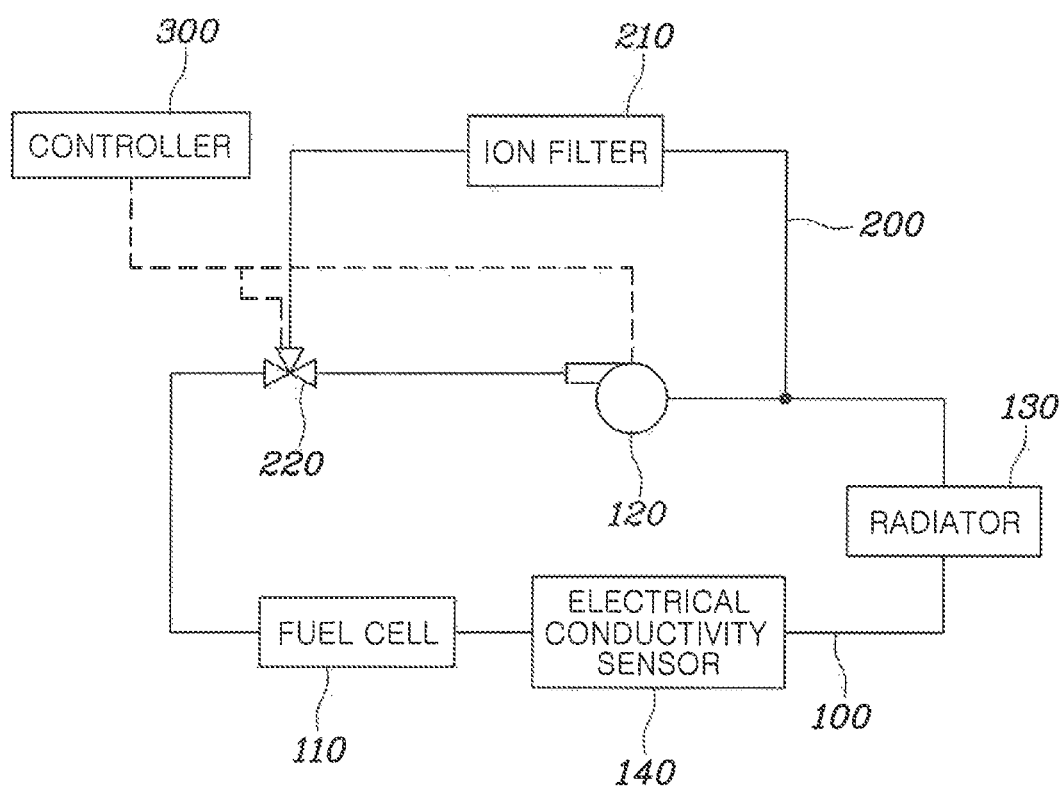
FIG. 3, FIG. 4, and FIG. 5 are block diagrams illustrating a coolant control system of a fuel cell according to various embodiments in an exemplary embodiment of the present invention.
Figure 4:
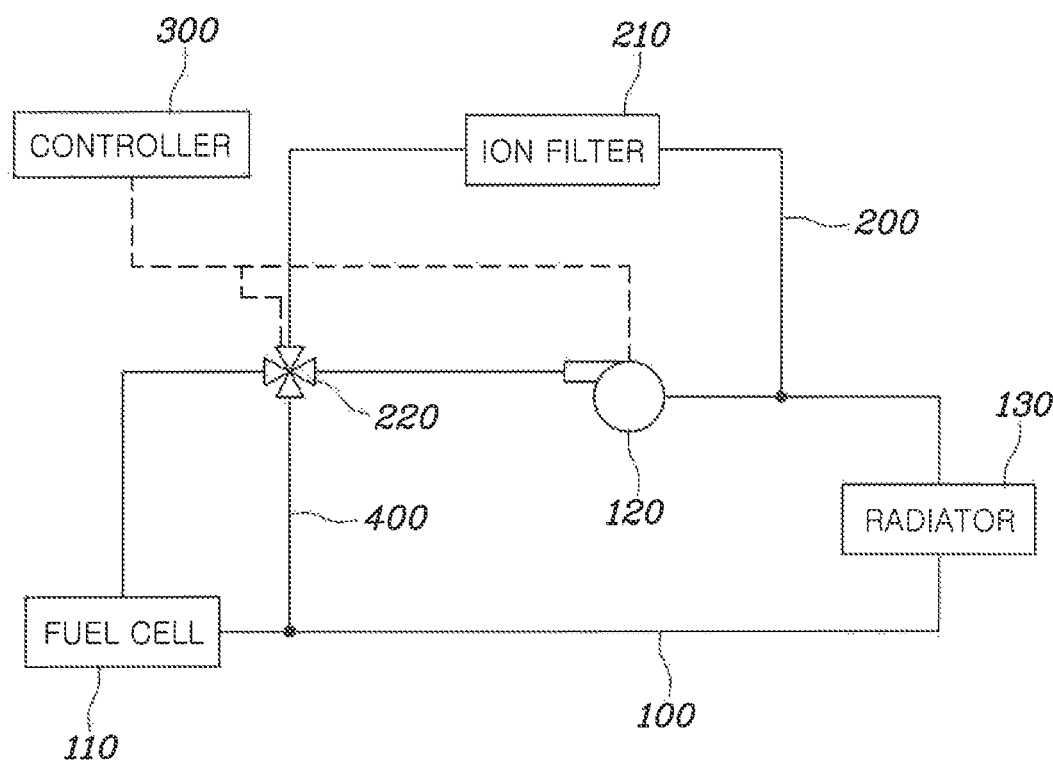
Figure 5:
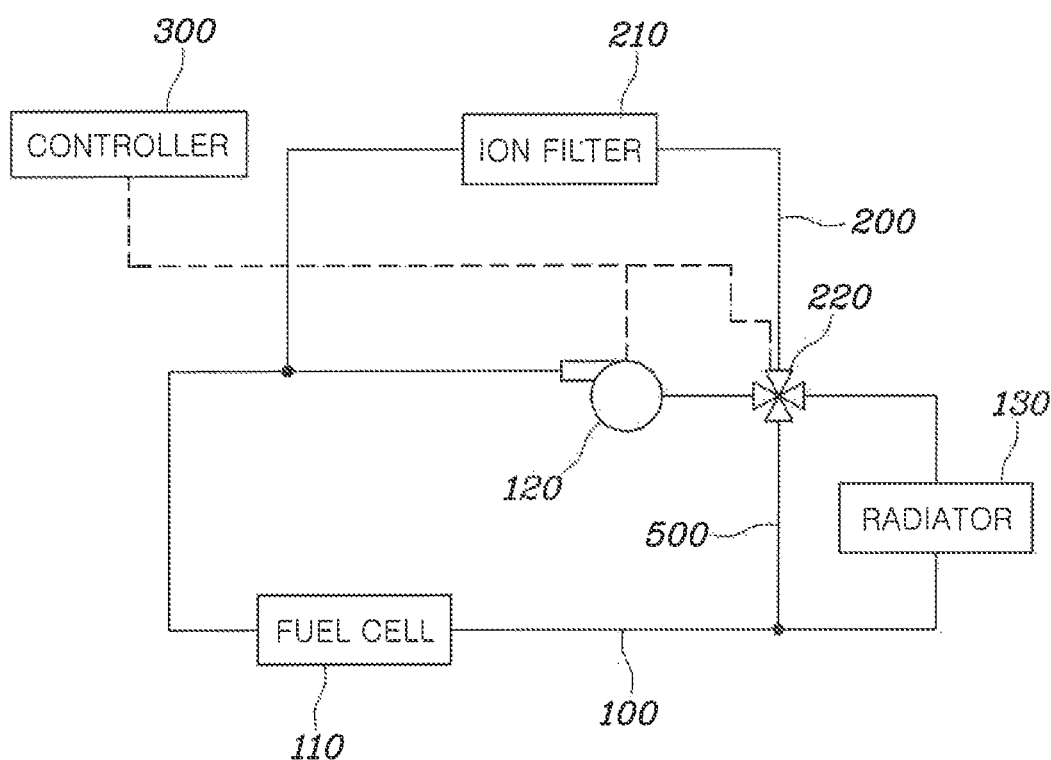

FIG. 3, FIG. 4, and FIG. 5 are block diagrams illustrating a coolant control system of a fuel cell 110 according to various embodiments in an exemplary embodiment of the present invention. In detail, FIG. 3 is a block diagram illustrating an exemplary embodiment of the present invention further including a conductivity sensor 140; FIG. 4 is a block diagram illustrating an exemplary embodiment of the present invention further including a first bypass passage 400 and a first bypass valve 220; and FIG. 5 is a block diagram illustrating an exemplary embodiment of the present invention further including a second bypass passage 500 and a second bypass valve 220.

Referring to FIG. 3, the coolant control system of a fuel cell may further include the conductivity sensor 140 provided on the coolant line 100 and detecting an electrical conductivity of a coolant flowing into the coolant line 100, wherein the controller 300 may control the adjusting valve 220 based on the electrical conductivity detected by the conductivity sensor 140.

In detail, the controller 300 may control the adjusting valve 220 to increase the ratio of the coolant flowing into the ion removal line 200 in case that the electrical conductivity detected by the conductivity sensor 140 is equal to or greater than a predetermined limit conductivity.

Therefore, in case that the electrical conductivity of the coolant detected by the conductivity sensor 140 is increased, the controller 300 may control the adjusting valve 220 to increase the ratio of the coolant flowing into the ion removal line 200. Accordingly, the controller 300 may have improved stability and reliability in controlling of the adjusting valve 220.

Furthermore, the controller 300 may detect not only the electric conductivity detected by the conductivity sensor 140 but also the temperature of the fuel cell 110 and the output voltage of the fuel cell 110. Therefore, the controller 300 may proactively prevent coolant from increasing the electric conductivity and may also cope with a situation where the conductivity sensor 140 is not operational, and may thus have an improved stability. Furthermore, the controller may delete a control to correct a detected value of the conductivity sensor 140 or reduce numbers of the control.

Referring to FIG. 4, the coolant control system of a fuel cell may further include a first bypass passage 400 branched from the coolant line 100 at an upstream point of the fuel cell 110, bypassing the fuel cell 110 and joining the coolant line 100 again; and a first bypass valve adjusting a ratio between the coolants respectively flowing into the coolant line 100 and the first bypass passage 400.

The first bypass passage 400 may be a line bypassing the fuel cell 110 on the coolant line 100, and a differential pressure may not be formed therein. In case that the required cooling amount of the fuel cell 110 is reduced, the controller 300 may increase a ratio of a coolant flowing into the first bypass passage 400, reducing a load of the cooling pump 120.

To increase the temperature of the fuel cell 110 in a cold-start state, the controller 300 may reduce the ratio of the coolant flowing into the fuel cell 110 and increase the ratio of the coolant flowing into the first bypass passage.

The adjusting valve 220 may be a four-way valve positioned at a point where the ion removal line 200 joins the coolant line 100 and integrated with the first bypass valve 220 to simultaneously adjust the ratio between the coolants respectively flowing into the coolant line 100 and the ion removal line 200 and the ratio between the coolants respectively flowing into the coolant line 100 and the first bypass passage 400.

The controller 300 may control the adjusting valve 220 to simultaneously adjust the ratio between the coolants respectively flowing into the coolant line 100 and the ion removal line 200 and the ratio between the coolants respectively flowing into the coolant line 100 and the first bypass passage 400.

Referring to FIG. 5, the coolant control system of a fuel cell may further include a second bypass passage 500 branched from the coolant line 100 at a downstream point of the fuel cell 110, bypassing the radiator 130 provided on the coolant line 100 and joining the coolant line 100 again; and a second bypass valve adjusting a ratio between the coolants respectively flowing into the coolant line 100 and the second bypass passage 500.

The second bypass passage 500 may reduce the required cooling amount of the coolant due to a heat-exchange thereof with the outside air by bypassing the radiator 130.

The adjusting valve 220 may be a four-way valve positioned at a point where the coolant line 100 is branched to the ion removal line 200 and integrated with the second bypass valve 220 to simultaneously adjust the ratio between the coolants respectively flowing into the coolant line 100 and the ion removal line 200 and the ratio between the coolants respectively flowing into the coolant line 100 and the second bypass passage 500.

Referring to FIG. 2 again, a coolant control method of a fuel cell 110 according to an exemplary embodiment in an exemplary embodiment of the present invention may include: measuring an output voltage of the fuel cell 110 (S400); and adjusting a ratio between coolants respectively flowing into a coolant line 100 and an ion removal line 200 which is provided with an ion filter 210 and branched from and again joining the coolant line 100 based on a measured output voltage of the fuel cell 110 (S500).

In detail, in the adjusting of the ratio between the coolants respectively flowing into the coolant line 100 and the ion removal line 200 (S500), the adjusting valve 220 may be controlled so that the above ratio is any one of a plurality of predetermined ratios.

In an exemplary embodiment of the present invention, the controller 300 may predetermine first and second open degrees of the adjusting valve 220. The first open degree may be predetermined so that the ratio of the coolant flowing into the ion removal line 200 is relatively great (S510), and the second open degree may be predetermined so that the ratio of the coolant flowing into the ion removal line 200 is relatively small (S520).

In the adjusting of the ratio between the coolants (S500), the adjusting valve 220 may be controlled to increase the ratio of the coolant flowing into the ion removal line 200 (S510) in case that the output voltage of the fuel cell 110 is equal to or greater than a predetermined total voltage.

The coolant control method of a fuel cell 110 according to an exemplary embodiment in an exemplary embodiment of the present invention may further include: measuring or estimating a temperature of the fuel cell 110 (S200 or S300) before the adjusting of the ratio between the coolants (S500), wherein in the adjusting of the ratio between the coolants (S500), the adjusting valve 220 may be controlled to increase the ratio of the coolant flowing into the ion removal line 200 (S510) only in case that either a measured or estimated temperature of the fuel cell 110 is lower than a predetermined limit temperature or the measured or estimated temperature of the fuel cell 110 is lower than a temperature obtained by adding a predetermined difference value to a control target temperature.

The coolant control method of a fuel cell 110 may further include: measuring or estimating a temperature of the fuel cell 110 (S200 or S300) before the adjusting of the ratio between the coolants (S500), wherein in the adjusting of the ratio between the coolants (S500), the adjusting valve 220 may be controlled to decrease the ratio of the coolant flowing into the ion removal line 200 (S520) in case that the measured or estimated temperature of the fuel cell 110 is equal to or higher than the predetermined limit temperature, the measured or estimated temperature of the fuel cell 110 is equal to or greater than the temperature obtained by adding the predetermined difference value to the control target temperature, or the output voltage of the fuel cell 110 is lower than the predetermined total voltage.

The coolant control method of a fuel cell 110 may further include: detecting an electrical conductivity of a coolant flowing into the coolant line 100 (S100) before the adjusting of the ratio between the coolants (S500), wherein in the adjusting of the ratio between the coolants, the adjusting valve 220 may be controlled to increase the ratio of the coolant flowing into the ion removal line 200 in case that the detected electrical conductivity of the coolant is equal to or greater than a predetermined limit conductivity.

According to the coolant control system and control method of the fuel cell in an exemplary embodiment of the present invention, it is possible to predict that the high potential occurs in the separation plate in the fuel cell stack, and thus the electrical conductivity of the coolant may be reduced.

Furthermore, it is possible to prevent the corrosion of the separation plate in the fuel cell stack and accordingly, the fuel cell stack may have an improved durability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A coolant control system of a fuel cell, the system comprising:
   the fuel cell;
   a coolant line connected to the fuel cell and allowing a coolant to circulate in the coolant line to be heat-exchangeable with the fuel cell;
   an ion removal line provided with an ion filter and connected to a first portion and a second portion of the coolant line to allow a coolant branched from the first portion of the coolant line to pass through the ion filter and then flow into the second portion of the coolant line;
   an adjusting valve connected to the coolant line and the ion removal line and configured of adjusting a ratio between a first amount and a second amount of the coolant, wherein the first amount of the coolant flows into the coolant line and the second amount of the coolant flows into the ion removal line;
a controller engaged to the adjusting valve and configured for controlling the adjusting valve based on a temperature of the fuel cell or an output voltage of the fuel cell;
a first bypass passage branched from the coolant line at a third portion of the coolant line, wherein the third portion of the coolant line is a point located upstream of the fuel cell, the first bypass passage bypassing the fuel cell and joining the coolant line downstream of the fuel cell; and
a first bypass valve connected to the first bypass passage and adjusting a ratio between the first amount and a third amount of the coolant flowing into the coolant line and the first bypass passage respectively.

2. The coolant control system of the fuel cell of claim 1, wherein the adjusting valve is a three-way valve positioned at a first point where the coolant line is branched to the ion removal line or positioned at a second point where the ion removal line joins the coolant line.

3. The coolant control system of the fuel cell of claim 1, wherein the controller is configured to control the adjusting valve to increase a ratio of the second amount of the coolant flowing into the ion removal line, upon determining that the output voltage of the fuel cell is equal to or greater than a predetermined total voltage.

4. The coolant control system of the fuel cell of claim 3, wherein the controller is configured to compare the temperature of the fuel cell with a predetermined limit temperature and is configured to control the adjusting valve to increase the ratio of the second amount of the coolant flowing into the ion removal line, upon determining that the temperature of the fuel cell is lower than the predetermined limit temperature.

5. The coolant control system of the fuel cell of claim 3, wherein the controller is configured to compare the temperature of the fuel cell with a control target temperature and is configured to control the adjusting valve to increase the ratio of the second amount of the coolant flowing into the ion removal line, upon determining that the temperature of the fuel cell is lower than a temperature obtained by adding a predetermined difference value to the control target temperature.

6. The coolant control system of the fuel cell of claim 1, wherein the fuel cell is a fuel cell stack including a plurality of unit cells, and
wherein the controller is configured to determine an average cell voltage by dividing the output voltage of the fuel cell by a total number of the cells and is configured to control the adjusting valve to increase a ratio of the second amount of the coolant flowing into the ion removal line, upon determining that a determined average cell voltage is equal to or greater than a predetermined cell voltage.

7. The coolant control system of the fuel cell of claim 6, wherein the controller is configured to compare the temperature of the fuel cell with a predetermined limit temperature and is configured to control the adjusting valve to increase the ratio of the second amount of the coolant flowing into the ion removal line, upon determining that the temperature of the fuel cell is lower than the predetermined limit temperature.

8. The coolant control system of the fuel cell of claim 6, wherein the controller is configured to compare the temperature of the fuel cell with a control target temperature and is configured to control the adjusting valve to increase the ratio of the second amount of the coolant flowing into the ion removal line, upon determining that the temperature of the fuel cell is lower than a temperature obtained by adding a predetermined difference value to the control target temperature.

9. The coolant control system of the fuel cell of claim 1, wherein the controller is configured to control the adjusting valve to decrease a ratio of the second amount of the coolant flowing into the ion removal line, upon determining that the temperature of the fuel cell is equal to or higher than a predetermined limit temperature, the temperature of the fuel cell is equal to or greater than a temperature obtained by adding a predetermined difference value to a control target temperature, or the output voltage of the fuel cell is lower than a predetermined total voltage.

10. The coolant control system of the fuel cell of claim 1, further including:
a conductivity sensor provided on the coolant line and configured for detecting an electrical conductivity of the coolant flowing into the coolant line,
wherein the controller is configured to control the adjusting valve based on the electrical conductivity detected by the conductivity sensor.

11. The coolant control system of the fuel cell of claim 10, wherein the controller is configured to control the adjusting valve to increase a ratio of the second amount of the coolant flowing into the ion removal line, upon determining that the electrical conductivity detected by the conductivity sensor is equal to or greater than a predetermined limit conductivity.

12. The coolant control system of the fuel cell of claim 1, wherein the adjusting valve is a four-way valve positioned at the second portion of the coolant line where the ion removal line joins the coolant line and integrated with the first bypass valve to adjust the ratio between the first and second amounts of the coolant respectively flowing into the coolant line and the ion removal line and a ratio between the first amount and the third amount of the coolant flowing into the coolant line and the first bypass passage respectively.

13. A coolant control method of a fuel cell, the method comprising:
measuring an output voltage of the fuel cell; and
adjusting, by a controller, a ratio between a first amount and a second amount of a coolant, based on a measured output voltage of the fuel cell, wherein the first amount and the second amount of the coolant respectively flow into a coolant line and an ion removal line which is provided with an ion filter and is branched from a first portion of the coolant line and joined to a second portion of the coolant line,
wherein a first bypass passage is branched from the coolant line at a third portion of the coolant line, wherein the third portion of the coolant line is a point located upstream of the fuel cell, the first bypass passage bypassing the fuel cell and joining the coolant line downstream of the fuel cell, and
wherein a first bypass valve is connected to the first bypass passage and adjusts a ratio between the first amount and a third amount of the coolant flowing into the coolant line and the first bypass passage respectively.

14. The coolant control method of the fuel cell of claim 13, wherein in the adjusting of the ratio between the first amount and the second amount of the coolant, the adjusting valve is controlled by the controller to increase a ratio of the second amount of the coolant flowing into the ion removal line, upon determining, by the controller, that the measured output voltage of the fuel cell is equal to or greater than a predetermined total voltage.

15. The coolant control method of the fuel cell of claim 14, further including:
   measuring or estimating a temperature of the fuel cell before the adjusting of the ratio of the first amount and the second amount of the coolant,
   wherein in the adjusting of the ratio of the first amount and the second amount of the coolant, the adjusting valve is controlled to increase the ratio of the second amount of the coolant flowing into the ion removal line, upon determining, by the controller, that either a measured or estimated temperature of the fuel cell is lower than a predetermined limit temperature or the measured or estimated temperature of the fuel cell is lower than a temperature obtained by adding a predetermined difference value to a control target temperature.

16. The coolant control method of the fuel cell of claim 13, further including:
   measuring or estimating a temperature of the fuel cell before the adjusting of the ratio of the first amount and the second amount of the coolant,
   wherein in the adjusting of the ratio of the first amount and the second amount of the coolant, the adjusting valve is controlled to decrease a ratio of the second amount of the coolant flowing into the ion removal line, upon determining, by the controller, that a measured or estimated temperature of the fuel cell is equal to or higher than a predetermined limit temperature, the measured or estimated temperature of the fuel cell is equal to or greater than a temperature obtained by adding a predetermined difference value to a control target temperature, or the measured output voltage of the fuel cell is lower than a predetermined total voltage.

17. The coolant control method of the fuel cell of claim 13, further including:
   detecting an electrical conductivity of a coolant flowing into the coolant line before the adjusting of the ratio of the first amount and the second amount of the coolant,
   wherein in the adjusting of the ratio of the first amount and the second amount of the coolant, the adjusting valve is controlled to increase a ratio of the second amount of the coolant flowing into the ion removal line, upon determining, by the controller, that the detected electrical conductivity of the coolant is equal to or greater than a predetermined limit conductivity.

* * * * *